United States Patent [19]

Brailean et al.

[11] Patent Number: 5,970,056
[45] Date of Patent: Oct. 19, 1999

[54] METHOD OF COMMUNICATION RESOURCE ASSIGNMENT

[75] Inventors: Karen A. Brailean, Park Ridge; Jeffrey Blanchette, Palatine; Timothy Spets, Algonquin; Kenneth J. Crisler, Lake Zurich; Loren J. Rittle, Naperville, all of Ill.

[73] Assignee: Motorola, Inc., Schaumburg, Ill.

[21] Appl. No.: 08/801,223

[22] Filed: Feb. 19, 1997

[51] Int. Cl.$^6$ ........................................ H04L 5/16
[52] U.S. Cl. ........................ 370/296; 370/348; 455/509
[58] Field of Search ................................ 370/407, 408, 370/296, 348, 442, 446, 447; 455/509, 510, 517, 575, 78, 83

[56] References Cited

U.S. PATENT DOCUMENTS 5,715,474  2/1998  Burke et al. ............................ 395/826
5,761,201  6/1998  Vaudreuil ................................ 370/389

*Primary Examiner*—Chi H. Pham
*Assistant Examiner*—Maikhanh Tran
*Attorney, Agent, or Firm*—Susan L. Lukasik; Steven A. May

[57] ABSTRACT

In a communication system, a method comprises the steps of receiving (401) at least one information bundle intended for subsequent outbound transmission, receiving (403) at least one reservation request that corresponds to at least one information bundle intended for subsequent inbound transmission, and selecting (407) from amongst the at least one information bundle and the at least one reservation request to provide at least one selected information bundle to be transmitted. At least a part of a communication resource is assigned (409) to support transmission of the at least one selected information bundle.

28 Claims, 4 Drawing Sheets

METHOD OF COMMUNICATION RESOURCE ASSIGNMENT

FIELD OF THE INVENTION

This invention relates to communication systems, including but not limited to allocation of communication resources in communication systems.

BACKGROUND OF THE INVENTION

Communication systems on which data messages are transmitted are well known in the art. Before a user may transmit data, many systems require a data communication unit to first request a communication resource, such as a wireline, frequency, frequency pair, TDM (time division multiplexed) time slot, a recurring TDMA (time division multiple access) time slot, a single-shot use of a sequence of TDMA time slots, and so forth. By way of a controller or other resource allocation device, the system receives the request, also known as a reservation request, allocates a communication resource, and transmits a reservation grant that provides the user of the data unit with the exclusive use of the assigned communication resource during an allotted time. In systems supporting voice communications, communication resources may be allocated in basically the same manner.

Communication systems also provide control channels that comprise communication resources reserved for communications between member communication units and the communication infrastructure for the purposes of, inter alia, transmitting reservation requests and reservation grants to gain/grant system access. Most control channels in dispatch communication systems and other trunked communication systems are half-duplex in nature. An example of a full-duplex control channel can be found in U.S. Pat. No. 5,574,788, wherein a full-duplex control channel allows for "simultaneous in-bound and out-bound signalling" of control information. Such an approach, however, is far from desirable. It is quite costly to implement, often leads to a waste of valuable bandwidth, and will typically lead to wasteful battery consumption in a portable unit. Further, there is no particular value to the average user that might offset these significant costs.

In communication systems today, it is possible for both voice communications and data communications to be assigned to the same communication resource. TDMA, a common method for allocating communication resources, breaks the channel into individually allocatable time slots. Voice and circuit data communications typically take place in a recurring reserved TDMA time slot, whereas packet data communications typically take place in a single-shot use of a sequence of TDMA time slots. Both voice communications and data communications in a communication system may be full-duplex communications, wherein a single communication unit transmits and receives at the same time. Both voice communications and data communications in a communication system may be half-duplex communications, wherein a communication unit at any given time may only transmit or receive on a communication resource, but may not do both. Some communication units, although full-duplex, may need to only transmit or receive during a given period of time. In addition, all communications allocated to a particular full-duplex communication resource(s) may be reserved as full-duplex communications, even though the communication unit is not capable of full-duplex communications.

A single communication system may handle both voice and data communications, as well as both full-duplex and half-duplex communications. As a result, when a system controller allocates communication resources to support reservation requests, a communication system with both full-duplex and half-duplex communication units may have a communication resource allocated to these various communications as shown in FIG. 1. In the timing diagram of FIG. 1, inbound transmissions and outbound transmissions are shown for the same communication resource. Full-duplex communications 101 and 107 occupy both the inbound and outbound bandwidth of the communication resource depicted. Inbound only transmissions 103 and 111 and outbound only transmissions 105, 109, and 113 are shown in the appropriate inbound and outbound portions for the communication resource. As can be seen from the timing diagram of FIG. 1, much valuable bandwidth for the depicted communication resource is wasted because some communications 103, 105, 109, 111, and 113 occupy only one-half of the allotted bandwidth, either inbound or outbound, whether the transmission is sourced by full-duplex or half-duplex communication units.

Accordingly, there is a need for a method of allocating communication resources, which method efficiently allocates inbound and outbound resources without wasting valuable bandwidth.

DESCRIPTION OF A PREFERRED EMBODIMENT

Figure 1:
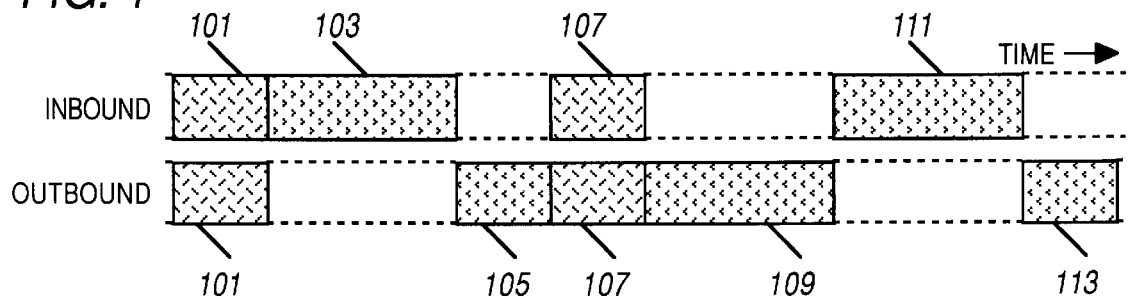
FIG. 1 is a timing diagram showing resource allocation for inbound and outbound portions of a communication resource.

The following describes a method of efficiently allocating inbound and outbound communication resources without wasting valuable bandwidth. In addition, methods are provided to avoid assignment of simultaneous reception and transmission by a half-duplex unit, thereby avoiding the need for extra transmissions by half-duplex units to request retransmission of data and for the actual retransmissions of the data.

In a communication system, a method comprises the steps of receiving at least one information bundle intended for subsequent outbound transmission, receiving at least one reservation request that corresponds to at least one information bundle intended for subsequent inbound transmission, and selecting from amongst the at least one information bundle and the at least one reservation request to provide at least one selected information bundle to be transmitted. At least a part of a communication resource is assigned to support transmission of the at least one selected information bundle.

Additional features include the reception of a plurality of information bundles intended for subsequent outbound transmission and/or a plurality of reservation requests that correspond to information bundles intended for subsequent inbound transmission. The plurality of information bundles may be separately intended for subsequent outbound transmission to mutually exclusive target communication units or intended for subsequent outbound transmission to a common target communication unit. At least two information bundles may be separately intended for subsequent outbound transmission to mutually exclusive target communication units, and at least two information bundles may be intended for subsequent outbound transmission to a common target communication unit.

The step of selecting from amongst the at least one information bundle and the at least one reservation request may provide at least one selected information bundle to be transmitted and the step of selecting from amongst the plurality of information bundles and the plurality of reservation requests may provide one or more selected information bundles to be transmitted, and at least one information bundle may be transmitted to a first communication unit and at least one information bundle may correspond to a reservation request from a second communication unit.

The step of selecting from amongst the at least one information bundle and the at least one reservation request to provide at least one selected information bundle to be transmitted may also include the step of ensuring that a transmission as corresponds to the selected information bundle does not conflict with a half-duplex operation mode of a communication unit that corresponds to that transmission. The step of selecting from amongst the at least one information bundle and the at least one reservation request to provide at least one selected information bundle to be transmitted may also include the step of selecting as a function, at least in part, of an indication of priority as contained in at least one of the information bundles. The step of selecting from amongst the at least one information bundle and the at least one reservation request to provide at least one selected information bundle to be transmitted may also include the step of selecting as a function, at least in part, of an indication of priority as contained in at least one of the reservation requests. The step of selecting from amongst the at least one information bundle and the at least one reservation request to provide at least one selected information bundle to be transmitted may also include the step of selecting as a function, at least in part, of an indication of priority as contained in at least one of the information bundles and reservation requests. The step of selecting from amongst the at least one information bundle and the at least one reservation request to provide at least one selected information bundle to be transmitted includes the step of selecting as a function, at least in part, of any of the following: time of arrival; size of total message; system control information as versus user information; half-duplex as versus full-duplex operability of a particular communication unit, an indication of priority; inbound as versus outbound transmission (wherein inbound may be favored or favoring inbound and outbound transmission is alternated).

Alternatively, in a wireless two-way communication system, a method of communication assignment comprises the steps of receiving a plurality of information bundles intended for subsequent outbound transmission, wherein at least one of the information bundles is intended for reception by a half-duplex communication unit; receiving at least one reservation request that corresponds to at least one information bundle intended for subsequent inbound transmission by the half-duplex communication unit; and selecting from amongst the plurality of information bundles and the at least one reservation request to provide at least two selected information bundles to be transmitted, wherein the selection avoids simultaneous reception and transmission by the half-duplex communication unit. At least a part of a communication resource is assigned to support transmission of the selected information bundles.

Figure 2:
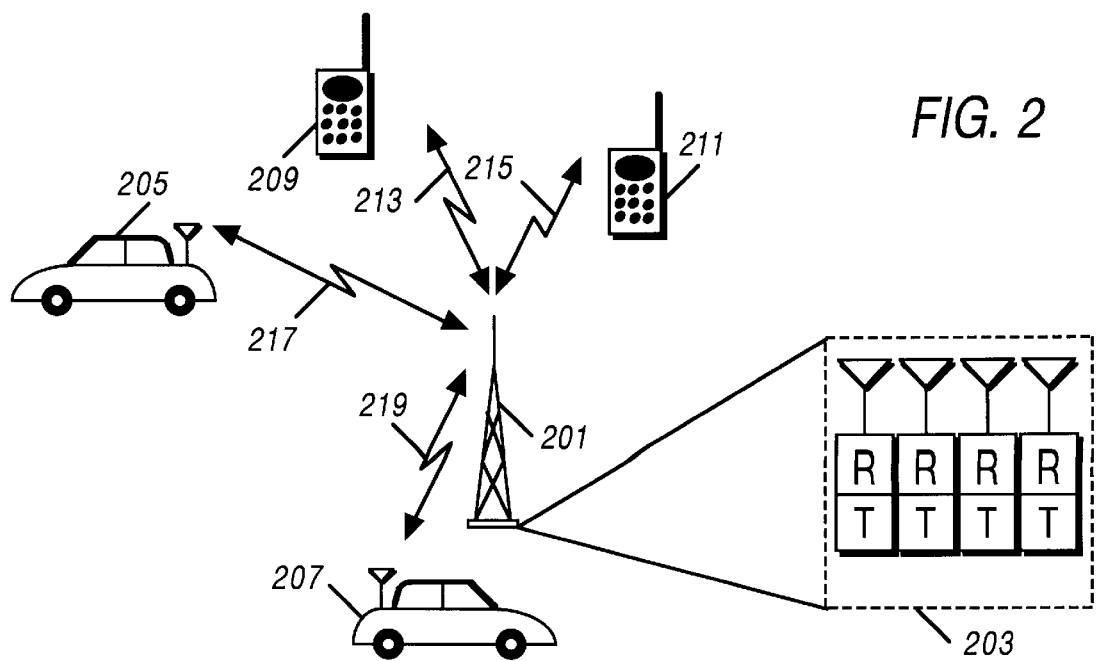
FIG. 2 is a block diagram of a communication system in accordance with the invention.

A block diagram of a communication system is shown in FIG. 2. A communication site 201 having a plurality of repeaters 203 is capable of receiving and transmitting communications from a plurality of communication units 205, 207, 209, and 211. In the preferred embodiment, wireless communications 213, 215, 217, and 219 take place between the communication site 201 and the communication units on communication resources allocated by a resource allocator such as a base radio controller at the communication site 201. A resource allocator, such as a base radio controller, turns the communication resource(s) on and off, assigns communication resource(s) to communication unit(s), and informs the unit(s) of the current and future assignments. The resource allocator also receives and transmits information bundles. The communications 213, 215, 217, and 219 may be full-duplex or half-duplex communications.

Figure 3:
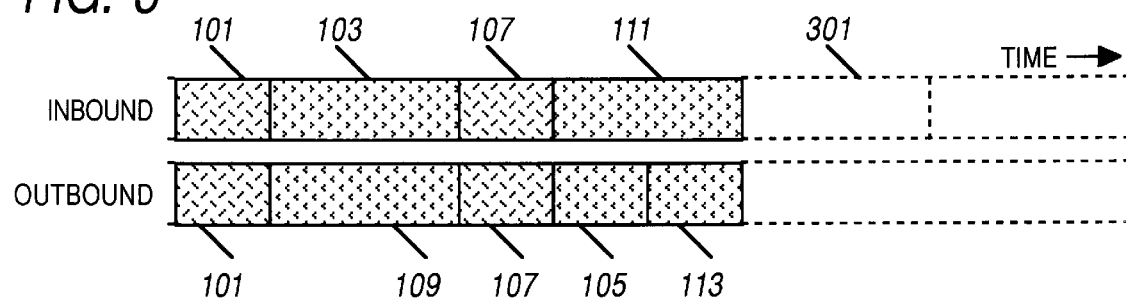
FIG. 3 is a timing diagram showing resource allocation in accordance with the invention.

A timing diagram showing an application of a method of allocating a communication resource in accord with the present invention is shown in the timing diagram of FIG. 3. The timing diagram of FIG. 3 is an application of the present invention to the same requests for allocation of communication resources as were received with respect to the timing diagram of FIG. 1. The resource allocator receives information bundles 105, 109, and 113 intended for subsequent outbound transmission to one or more communication units. In the preferred embodiment, an access controller gateway receives the information bundles 105, 109, 113 intended for subsequent outbound transmission from the transmitter of the information bundles 105, 109, and 113, prioritizes them, and forwards them to the resource allocator. For ease of reference, an information bundle intended for subsequent outbound transmission will be hereinafter referred to as an "OB". An information bundle generally is one or more protocol data units, each consisting of several data bytes that convey information. In the preferred embodiment, a bundle is comprised of 1 to 81 (nominally 2) packets, and each packet is comprised of 1 to 1500 (nominally 441) octets.

The resource allocator also receives one or more reservation requests that correspond to one or more information bundles 103 and 111 intended for subsequent inbound transmission. The transmission of the reservation requests may be made by the same or different communication units than communication units that are the intended targets of the OBs. For ease of reference, an information bundle corresponding to a reservation request and intended for subsequent inbound transmission will be hereinafter referred to as an "IB".

In accord with the present invention, the resource allocator assigns at least a part of the communication resource to support simultaneous outbound transmission of an OB and inbound transmission of an IB on the full-duplex communication resource shown in FIG. 3. For example, because a communication 101 is transmitted by a full-duplex communication unit, the communication 101 is allocated both inbound and outbound portions of the communication resource, and no additional information may be transmitted in either the inbound or outbound portion of the communication resource during the time in which that full-duplex communication 101 takes place. The resource allocator, in accord with the present invention, may then select the reservation request corresponding to the IB 103 and the OB 109 and match these information bundles for simultaneous transmission on the communication resource. In this example, the reservation request corresponding to the IB 103, is sourced by a first communication unit and the OB 109 received by the resource allocator is intended for a second communication unit, which is not the same communication unit as the first communication unit. Thus, two different communication units are granted use of the same communication resource at the same time.

Similarly, the reservation request corresponding to the IB 111 is allocated to the inbound portion of the communication resource at the same time the outbound portion of the communication resource is, in serial, allocated to transmission of the OBs 105 and 113, wherein the OBs 105 and 113 are directed at a different communication unit than the communication unit that sources the IB 111. As is shown in FIG. 3, transmission of the IB 105 was delayed until after transmission of bundle 107, thereby resulting in more efficient use of bandwidth. Although in the timing diagram, the IB 105 appears to suffer a delay because of use of the present method, such may not be the case because the present invention's efficient allocation of bandwidth often results in available bandwidth opening up sooner, thus the OB may actually be transmitted in real time before it would have been transmitted in the system applying resource allocation in the manner of FIG. 1. As can be seen from the timing diagram of FIG. 3, a significant amount of bandwidth is saved and may be allocated elsewhere by employing the present method of communication resource allocation.

The timing diagram of FIG. 3 shows the most optimal allocation of resources possible for the requests for channel space shown. For the resource allocation shown in FIG. 3 to occur, the requests for the allocations would need to be present before the allocation of the resource. Take, as an example, that the same resource requests and OBs are received as for the example of FIG. 1, except that the request to transmit the IB 103 is received after the request to transmit the IB 111 is received, and the request to transmit the IB 111 is queued after the full-duplex request for communication 107. FIG. 3 would then show idle time where the IB 103 currently resides, and the IB 103 would follow immediately after the IB 111, in the slot marked with reference numeral 301. As can be see in FIG. 3, an improvement in resource allocation efficiency is still gained over the allocation shown in FIG. 1. Thus, although optimal allocation of resources may not be possible due to the order in which requests and OBs are received, an improvement in resource allocation efficiency is still achievable with practice of the present invention. Minimally, an improvement results because communication units do not miss transmissions that likely would have been missed without practice of the present invention. Fewer requests for retransmissions and the retransmissions themselves are needed, resulting in more available space on communication resources.

Figure 4:
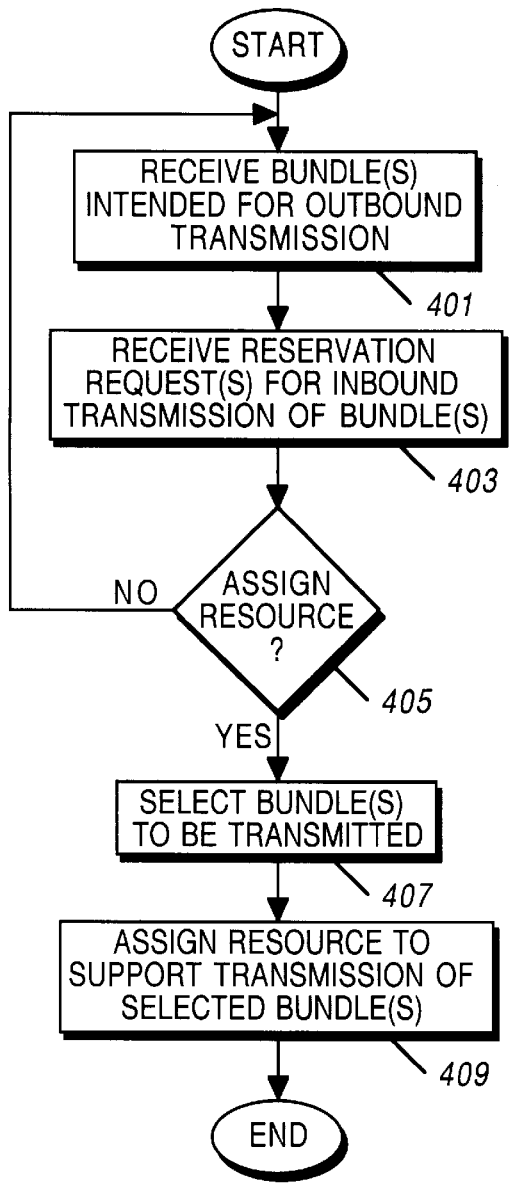
FIG. 4 is a flowchart depicting a method of assigning resources in a communication system in accordance with the invention.

A flowchart showing a method of allocating communication resources is shown in FIG. 4. At step 401, one or more OBs are received and queued in an outbound queue (if queuing is performed in this system), if such OBs have been transmitted. At step 403, one or more reservation requests corresponding to at least one IB are received and queued in an inbound queue (if queuing is performed in this system), if such reservation requests have been transmitted to the resource allocator. The ordering of steps 401 and 403 is not critical to successfully applying the present invention, as OBs and reservation requests relating to IBs may be received in any order and may be interspersed with one another without affecting successful practice of the present invention. For example, steps 1001, 1003, and 1005 may be performed instead of steps 401 and 403.

Figures 6, 7:
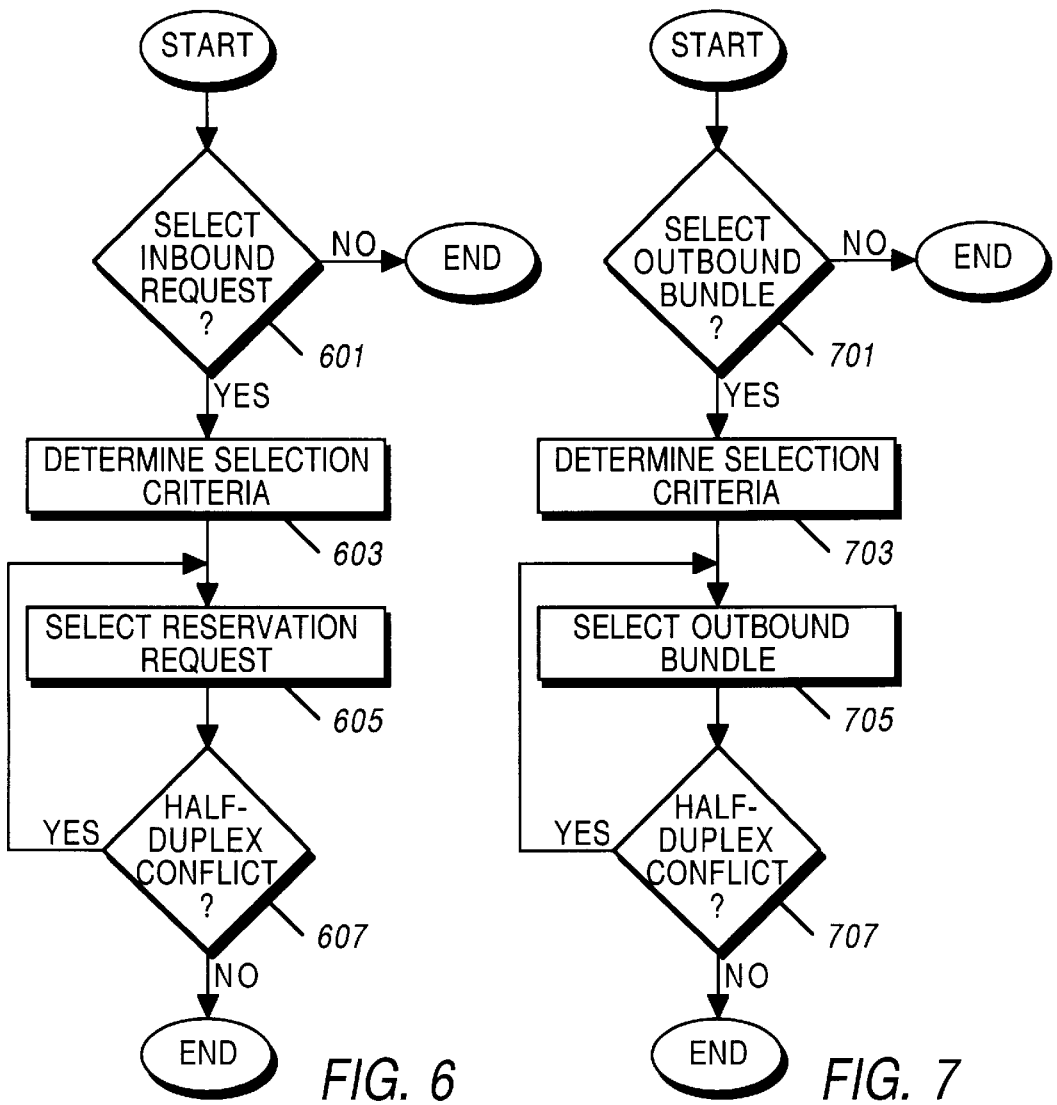
FIG. 6 is a flowchart depicting a method of selecting messages for assignment to inbound resources in a communication system in accordance with the invention.
FIG. 7 is a flowchart depicting a method of selecting messages for assignment to outbound resources in a communication system in accordance with the invention.

If at step 405 a communication resource is ready for allocation, and either an OB and/or a reservation request for an IB was received at step 401 or 403, the process continues with step 407, otherwise the process continues with step 401. Step 405 may be performed periodically or as a communication resource becomes available for allocation. At step 407, one or more bundles, IBs and/or OBs, are selected to be transmitted. The selecting process is performed by selecting from amongst the OBs received at step 401 and the reservation requests corresponding to IBs received at step 403. Thus, one or more IBs may be allocated for transmission on the inbound part of the communication resource and one or more OBs may be selected for transmission on the outbound portion of the same communication resource at the same time. An example of a method showing various options for selecting between OBs and reservation requests corresponding to OBs is shown in the flowcharts of FIG. 6 and FIG. 7. At step 409, a communication resource is assigned to support transmission of the bundle(s) selected at step 407. In the preferred embodiment, the assignment of communication resources includes the steps of checking if there was just an OB transmitted to a communication unit, and choosing the highest priority IB or OB. If the highest priority is an OB, checking if this OB is targetted for the same communication unit, and if so, checking if the highest priority IB reservation is from this communication unit, and if so, checking if there is a half duplex conflict; if not, granting the highest priority IB reservation. If not, assigning a communication resource to it, granting the reservation request if the chosen communication is an IB or transmitting the information bundle if it is an OB. If there was a half duplex conflict, choosing the next highest priority IB or OB and checking if there is a half duplex conflict. If not, assigning a communication resource to it, granting the reservation request if the chosen communication is an IB or transmitting the information bundle if it is an OB.

Figure 5:
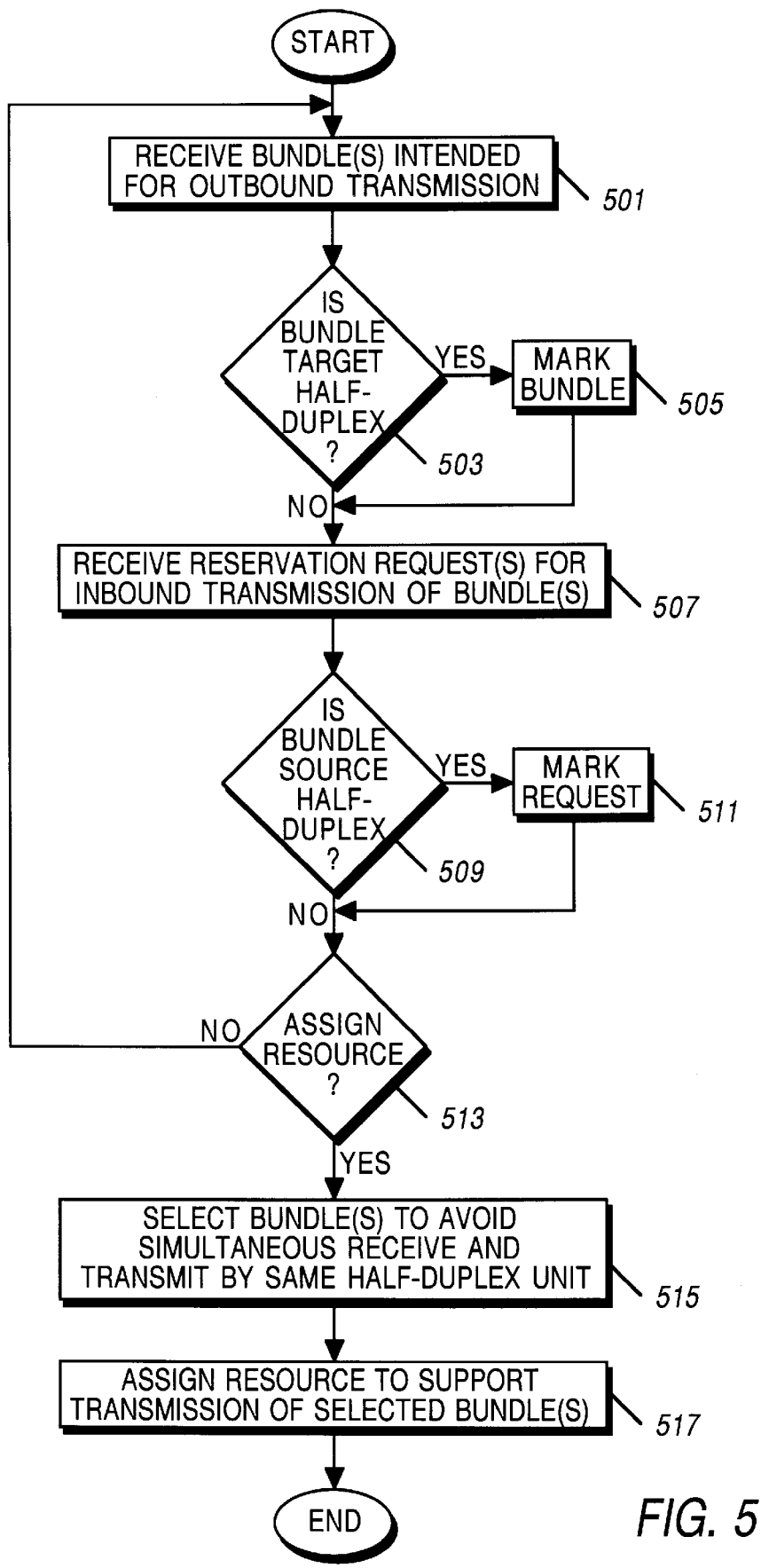
FIG. 5 is a flowchart depicting an alternate method of assigning resources in a communication system in accordance with the invention.

An alternative embodiment of the present invention is shown in the flowchart of FIG. 5. At step 501, one or more OBs are received, if such OBs have been transmitted. At step 503, it is determined if the intended target for the OB(s) received at step 501 is a half-duplex communication unit. If the target is a half-duplex communication unit at step 503, the OB(s) are marked as half-duplex outbound at step 505 and the process continues with step 507. Step 507, one or more reservation requests corresponding to at least one IB are received if such reservation requests have been transmitted to the resource allocator. At step 509, if the source of the IB relating to the reservation request of step 507 is a half-duplex communication unit, that reservation request is marked as half-duplex inbound at step 511 and the process continues with step 513. The ordering of steps 501, 503, 505, 507, 509, and 511 is not critical to successfully applying the present invention, as OBs and reservation requests relating to IBs may be received in any order and may be interspersed with one another without affecting successful practice of the present invention. For example, it may be assumed that an additional step, such as step 1001 of FIG. 10, may be performed ahead of step 501, and steps 501, 503, 505, 507, 509, and 511 are performed if an OB/IB reservation request is incoming and step 513 is performed if no OB/IB reservation request is incoming.

If at step 513 a communication resource is ready for allocation, and either an OB or a reservation request for an IB was received at step 501 or 507, the process continues with step 515, otherwise the process continues with step 501. Step 513 may be performed periodically or as a communication resource becomes available for allocation. At step 515, one or more bundles are selected for transmission such that simultaneous receive and transmit operations are avoided by the same half-duplex communication unit. For example, if the target of the OB of step 501 is the same as the source of the reservation request of step 507, the OB and reservation request will not be simultaneously selected for transmission on the same communication resource, thus avoiding conflict of communications for the half-duplex communication unit. An example of a method showing various options for selecting between OBs and reservation requests corresponding to OBs is shown in the flowcharts of FIG. 6 and FIG. 7. At step 517, communication resource is assigned to support the transmission of the bundle (IB and/or OB) selected at step 515. Thus, the present invention provides for a method of assigning both inbound and outbound portions of the same communication resource without causing a conflict for a communication unit by causing it to transmit at the same time that a message is being transmitted to the unit. Thus, the communication unit will not miss a communication.

A method of selecting amongst reservation requests corresponding to IBs is shown in the flowchart of FIG. 6. If at step 601, an inbound request is available to be selected, the process continues with step 603, otherwise the process ends. At step 603, the resource allocator determines selection criteria for selecting an inbound request. These selection criteria include time of arrival of the reservation request, size of the message to be transmitted, system control information as versus user information, half-duplex and versus full-duplex operability of a particular communication unit, an indication of priority of either the communication message or the communication unit. One or more of the criteria as stated in step 603 may be used when determining which communication request to select.

At step 605, a reservation request is selected according to the criteria determined at step 603. For example, if time of arrival is a selected criterion, then the first received reservation request will be selected before selecting a later received reservation request. If the criterion is size of total message, a smaller message may be transmitted before a larger message is transmitted or vice versa. If system control information as versus user information is the selected criterion, then system control information would be transmitted before user information. If half-duplex versus full-duplex operability of a particular communication unit is the selected criterion, then the message to the half-duplex communication unit is given priority because it has scheduling constraints not associated with full-duplex communication units. If indication of priority of either the communication unit or the communication message is the selected criteria, then a message with a higher priority will be selected before a message with a lower priority. Multiple scheduling criteria may also be used in determining a communication resource assignment. For example, the first received half-duplex communication request could be given priority. At step 607, it is determined if the selected reservation request from step 605 will cause a potential half-duplex conflict on the communication resource. If there is such a conflict, the process continues with step 605, where a new reservation request is selected to avoid conflict with the half-duplex communication unit, i.e., in other words, the selected reservation request happens to coincide with the current usage of a half-duplex communication unit in the receive mode at the same time the selected reservation request would have allocated a communication resource. If there is no half-duplex conflict at step 607, the process ends.

A method of selecting amongst OBs is shown in the flowchart of FIG. 7. At step 701, if an outbound bundle is available to be selected, the process continues with step 703, otherwise the process ends. At step 703, the resource allocator determines selection criteria for selecting an outbound request. These selection criteria include time of arrival of the reservation request, size of the message to be transmitted, system control information as versus user information, half-duplex and versus full-duplex operability of a particular communication unit, an indication of priority of either the communication message or the communication unit. One or more of the criteria as stated in step 703 may be used when determining which communication request to select.

At step 705, a reservation request is selected according to the criteria determined at step 703. For example, if time of arrival is a selected criterion, then the first received reservation request will be selected before selecting a later received reservation request. If the criterion is size of total message, a smaller message may be transmitted before a larger message is transmitted or vice versa. If system control information as versus user information is the selected criterion, then system control information would be transmitted before user information. If half-duplex versus full-duplex operability of a particular communication unit is the selected criterion, then the message to the half-duplex communication unit is given priority because it has scheduling constraints not associated with full-duplex communication units. If indication of priority of either the communication unit or the communication message is the selected criteria, then a message with a higher priority will be selected before a message with a lower priority. Multiple scheduling criteria may also be used in determining a communication resource assignment. For example, the first received half-duplex communication request could be given priority. At step 707, it is determined if the selected reservation request from step 705 will cause a potential half-duplex conflict on the communication resource. If there is such a conflict, the process continues with step 705, where a new reservation request is selected to avoid conflict with the half-duplex communication unit, i.e., in other words, the selected reservation request happens to coincide with the current usage of a half-duplex communication unit in the receive mode at the same time the selected reservation request would have allocated a communication resource. If there is no half-duplex conflict at step 707, the process ends.

When it is desired to simultaneously transmit IBs and OBs at a particular time on the same communication resource, a method for selecting both an OB and a request for transmission of an IB, such as the methods shown in FIG. 6 and FIG. 7, would both be employed to assign both the inbound and outbound portion of the same communication resource. Such an application of the present invention would, at times, result in assignment of the same communication resource to two different communication units, thereby resulting in more efficient assignment of the communication resource. Further, there may be advantage in selecting either an outbound message or an inbound message at a particular time, in which case only an inbound request or only an outbound request will be granted. In certain situations it may be desirable to favor the inbound transmission rather than favoring an outbound transmission, if the situation is appropriate. In one aspect of the preferred embodiment, because inbound channel access requires an expensive, in terms of inbound delay and throughput, reservation request/grant cycle, inbound transmission is granted priority over outbound transmission. In addition, it may be appropriate to favor an outbound transmission over an inbound transmission, i.e., to favor transmission direction over other selection criteria. For example, when an OB is delayed due to avoiding a half-duplex conflict, the OB may be given priority in the next available outbound resource. In addition, it may be desirable to alternate favoring inbound and outbound transmissions, such as when a large number of inbound communications are coming from a single unit and a large number of outbound communications are intended for another communication unit.

Figure 8:
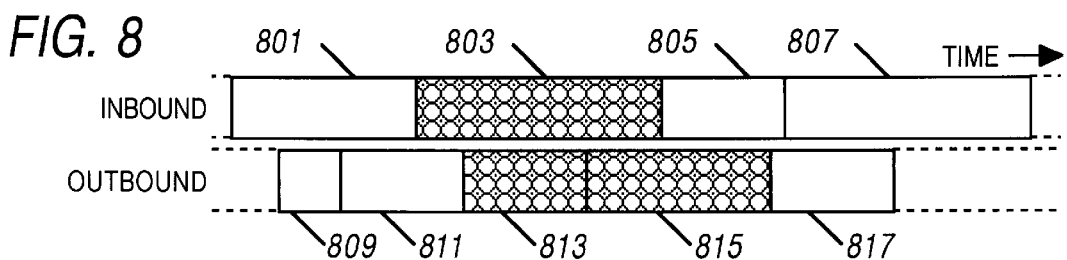
FIG. 8 is a timing diagram showing resource allocation for inbound and outbound portions of a communication resource.
Figure 9:
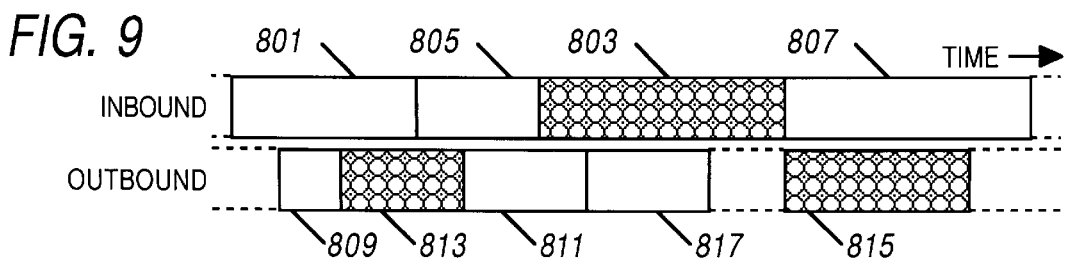
FIG. 9 is a timing diagram showing resource allocation in accordance with the invention.

The timing diagram of FIG. 8 depicts allocation of communications on a single full-duplex communication resource when the present invention is not practiced in assigning communication resources. Inbound communications 801, 803, 805, and 807 and outbound communications 809, 811, 813, 815, and 817 are assigned to the same full-duplex communication resource. In the example shown, the highlighted communications 803, 813, and 815 are designated to the same communication unit 205, where communication 803 is transmitted by the unit 205 and communications 813 and 815 are transmitted for receipt by the unit 205. If in this example, the unit 205 happens to be a half-duplex communication unit, it will be unable to receive communications 813 and 815 because the unit 205 is transmitting, and due to its half-duplex nature, cannot simultaneously receive. Hence, the unit 205 will either lose the data transmitted in communications 813 and 815 or need to transmit a request for retransmission of the communications 813 and 815, which will need to be retransmitted, resulting in wasted communication bandwidth. The problem described in the paragraph herein will hereinafter be referred to as the "half-duplex conflict" problem. In practice, the boundaries of inbound and outbound communications do not necessarily coincide, even for communications assigned to the same full-duplex communication unit, such as depicted in FIG. 8 and FIG. 9. The depiction of communication boundaries as shown in FIG. 1 and 3 is simplified to avoid needless over-complexity in the drawings.

One potential solution for solving the half-duplex conflict is to assume all communication units are full-duplex communication units, and to assign all communication units to both the inbound and outbound segments of the communication resource for the same period of time. Such allocation will solve the half-duplex conflict, but at the cost of valuable bandwidth. When utilizing this scheme, each half-duplex communication will waste the half of the communication resource that is not being used, resulting in 50% waste of the communication resource and a less-flexible resource allocation scheme. Another impractical solution involves denying allocation of half-duplex communications on full-duplex communication resources, particularly if a conflict arises.

Application of the present invention provides a solution to the half-duplex conflict that does not waste bandwidth. As shown in the timing diagram of FIG. 9, which uses the same requests for communication resources as were used for FIG. 8, the inbound and outbound segments of the full-duplex resource are assigned to a half-duplex communication unit 205 such that no simultaneous use of both the inbound and outbound segments takes place by the half-duplex unit 205.

One technique involves advancing an OB or reservation request relating to an IB in the queue. For example, when comparing FIG. 8 and FIG. 9, an outbound communication 813 is advanced in front of another outbound communication 811 in the outbound queue. Similarly, an inbound communication may be advanced in front of another inbound communication in the inbound queue (not shown). One method of advancing may include calculating ahead of a conflict to avoid a future conflict, for example by examining the entire inbound and outbound queues and estimating when communication resources may be assigned in both the inbound and outbound directions, and determining if a half-duplex conflict may arise in the estimation. OBs or reservation requests may then be placed ahead of one or more items higher in the queue so as to avoid the conflict.

Another technique involves delaying an OB or reservation request relating to an IB in the queue. For example, when comparing FIG. 8 and FIG. 9, an inbound communication 803 is delayed after another inbound communication 805 in the inbound queue. Similarly, an outbound communication 815 is delayed after another outbound communication 817 in the outbound queue. Another technique involves simply delaying an OB or reservation request relating to an IB until the communication unit 205 is no longer active on the communication resource. For example, when comparing FIG. 8 and FIG. 9, the outbound communication 815 is delayed after the preceding outbound communication 817 in the outbound queue. An inbound communication may be similarly delayed (not shown). Although these techniques may result in data being received out of order, many data communication systems, as is the case in the preferred embodiment, do not require data be received in any particular order, as the recipient is capable of reordering the data in the correct order.

As appropriate to the situation, any one or more of the above techniques may be applied to resolve a half-duplex conflict. FIG. 9 shows various uses of each of the above techniques to solve the particular half-duplex conflict at hand.

Figure 10:
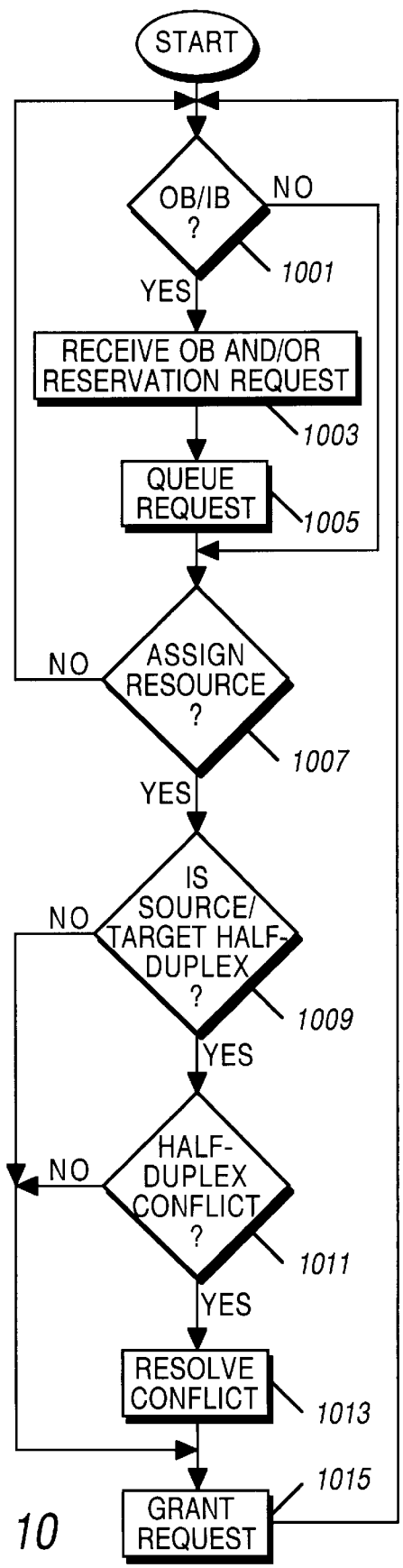
FIG. 10 is a flowchart depicting a method of assigning messages to resources while avoiding half-duplex conflicts in a communication system in accordance with the invention.

A flowchart depicting a method of assigning messages to resources while avoiding half-duplex conflicts in a communication system is shown in FIG. 10. The preferred embodiment of a method of avoiding half-duplex conflicts is shown in the steps of the flowchart of FIG. 10. If an OB or reservation request corresponding to an IB has been received for processing at step 1001, the process continues with step 1003, otherwise the process continues with step 1007. At step 1003, one or more OBs are received, if such OBs have been transmitted, and/or one or more reservation requests corresponding to at least one IB are received, if such reservation requests have been transmitted to the resource allocator. Appropriate processing, if any, is performed on items received in step 1003. The order of receiving OBs and reservation requests relating to IBs will not affect successful practice of the present invention. Although shown as a separate loop in the flowchart for simplicity, OBs and reservation requests relating to IBs may be received at any time in an on-going process, generally, even while other steps of the flowchart are being performed, e.g., steps 1007 through 1015, without affecting successful practice of the present invention.

At step 1005, the OB(s) and/or reservation request(s) received at step 1003 are queued, if necessary or desired. If at step 1007 a communication resource is ready for allocation, and either an OB and/or a reservation request for an IB are in the queue, i.e., either an OB and/or a reservation request for an IB was received at step 1003, an OB and/or a reservation request for an IB is selected, and the process continues with step 1009. If no communication resource is ready for allocation or no OB or a reservation request for an IB are in the queue, the process continues with step 1001. If at step 1007 an OB was selected, at step 1009, it is determined if the target (communication unit expected to receive the OB) of the selected OB is a half-duplex communication unit. One method of determining if a unit is half-duplex is to include in the reservation request information that permits the resource allocator to know if full-duplex operation is supported. Another method includes using a static database mapping unit identifications or numbers to full-duplex capability. Other methods are known in the art. If at step 1007 a reservation request for an IB was selected, at step 1009, it is determined if the source (communication unit expected to transmit the IB) of the selected IB is a half-duplex communication unit. If the source or target is not a half-duplex communication unit, i.e., the source or target is a full-duplex communication unit, the process continues with step 1015.

If the source or target is a half-duplex communication unit at step 1009, the process continues with step 1011, where it is determined if a half-duplex conflict is present. A half-duplex conflict is present, when, for example, the target or source from step 1009 is scheduled to be a source or target, respectively, for another communication at the same time. For example, if an OB was selected at step 1007, and the target of the OB is determined to be a half-duplex unit at step 1009, the resource allocator would check to see if the same half-duplex unit is scheduled to transmit on a communication resource in the same time interval as is currently being assigned by the resource allocator. If the same half-duplex unit is scheduled to transmit on a communication resource in the same time interval, then a half-duplex conflict is said to exist. Similarly, if a reservation request was selected at step 1007, and the source of the IB is determined to be a half-duplex unit at step 1009, the resource allocator would check to see if the same half-duplex unit is scheduled to receive on a communication resource in the same time interval as is currently being assigned by the resource allocator. If the same half-duplex unit is scheduled to receive on a communication resource in the same time interval, then a half-duplex conflict is said to exist.

If no half-duplex conflict is present at step 1011, the process continues with step 1015. If a half-duplex conflict is present at step 1011, the process continues with step 1013, where the half-duplex conflict is resolved. For example, the OB or reservation request may be advanced or delayed in the queue, or simply delayed until no conflict is present. Various techniques for resolving the half-duplex conflict are described with respect to FIG. 9. The process of resolving the half-duplex conflict may involve shuffling or scheduling a number of items in the inbound and/or outbound queues, and may also involve simply delaying assignment of the resource until the conflict is resolved, i.e., the communication unit in question is no longer active on a communication resource. For example, the resource allocator could assign the communication resource to the next item (full-duplex request or OB and/or reservation request) in the queue, and attempt to fill the selected OB and/or reservation request for an IB when the next communication resource becomes available, i.e., drop the request down one slot in the queue. If no other requests are present in the queue, or if the delay is relatively short, the resource allocator could place an appropriate delay on granting the request, which may result in no affect on the queue. For example, the unit is scheduled for use of a communication resource for 100 milliseconds, a 100 millisecond delay could be placed on the request before another attempt to process the request will be attempted. At step 1015, a grant is sent for the item (full-duplex request, OB, reservation request) selected from the queue, and the process continues with step 1003. In step 1013, another option is to discard the reservation request.

The present invention is described with respect to a single full-duplex communication resource. One of skill in the art, given the teachings provided herein, will be able to apply the present invention to the assignment of multiple full-duplex communication resources. For example, the resource allocator may assign full-duplex communication resources to half-duplex communication units while checking for half-duplex conflicts over any number of communication resources.

Although the preferred embodiment encompasses a wireless communication system, which includes TDMA communication resource allocation, the present invention may successfully be applied to a wireline communication system as well. The preferred embodiment comprises a slotted reservation ALOHA protocol, including centralized scheduling of information bundles to be transmitted. The use of a slotted reservation ALOHA protocol is not critical to the successful practice of the invention, as numerous other protocols will derive benefit from practicing the present invention.

The invention also includes the ability to assign one direction of a communication resource, either inbound or outbound, to a first full-duplex communication unit that only needs to use the one direction and assign the unused direction of the communication resource to a second (different) communication unit that is either half-duplex or full-duplex and only needs to use the unused direction.

The present method of communication resource allocation efficiently allocates inbound and outbound communication resources without wasting valuable bandwidth. The method seamlessly and efficiently integrates half-duplex and full-duplex communication units on full-duplex communication resources with minimal delay due to resolving half-duplex conflicts. Further, the present invention prevents the assignment of communications to communication resources such that half-duplex communication units are not assigned to transmit and receive at the same time, while assuring that the half-duplex communication units are allocated resources. The need for extra transmissions by half-duplex units to request retransmission of data and for the actual retransmissions of the data is thereby avoided. Assignment of communication resources need not follow the same order as the receipt of reservation requests or receipt of bundles requiring outbound transmission. The allocation method takes place using a resource allocator rather than using a token or best effort, resulting in communications traffic that is free of half-duplex conflict.

What is claimed is:

1. In a communication system, a method comprising the steps of:
   receiving a plurality of information bundles intended for subsequent outbound transmission to a first and a second communication unit;
   receiving a plurality of reservation requests that corresponds to information bundles intended for subsequent inbound transmission by the first and the second communication unit;

selecting from amongst the plurality of information bundles and the plurality of reservation requests to provide at least two selected information bundles to be transmitted; and assigning at least a part of a communication resource to support transmission of the at least two selected information bundles.

2. The method of claim 1, wherein the step of receiving a plurality of information bundles intended for subsequent outbound transmission includes the step of receiving a plurality of information bundles separately intended for subsequent outbound transmission to mutually exclusive target communication units.

3. The method of claim 1, wherein the step of receiving a plurality of information bundles intended for subsequent outbound transmission includes the step of receiving a plurality of information bundles intended for subsequent outbound transmission to a common target communication unit.

4. The method of claim 1, wherein the step of receiving a plurality of information bundles intended for subsequent outbound transmission includes the step of receiving at least two information bundles separately intended for subsequent outbound transmission to mutually exclusive target communication units and at least two information bundles intended for subsequent outbound transmission to a common target communication unit.

5. The method of claim 1, wherein the step of providing at least two selected information bundles to be transmitted includes the step of providing at least one information bundle to be transmitted to the first communication unit and at least one information bundle that corresponds to a reservation request from the second communication unit.

6. The method of claim 1, wherein the step of selecting from amongst the plurality of information bundles and the plurality of reservation requests to provide at least two selected information bundles to be transmitted includes the step of ensuring that a transmission as corresponds to the selected information bundles does not conflict with a half-duplex operation mode of a communication unit that corresponds to that trasnsmission.

7. The method of claim 1, wherein the step of selecting from amongst the plurality of information bundles and the plurality of reservation requests to provide at least two selected information bundles to be transmitted includes the step of selecting as a function, at least in part, of an indication of priority as contained in at least one of the plurality of information bundles.

8. The method of claim 1, wherein the step of selecting from amongst the plurality of information bundles and the plurality of reservation requests to provide at least two selected information bundles to be transmitted includes the step of selecting as a function, at least in part, of an indication of priority as contained in at least one of the plurality of reservation requests.

9. The method of claim 1, wherein the step of selecting from amongst the plurality of information bundles and the plurality of reservation requests to provide at least two selected information bundles to be transmitted includes the step of selecting as a function, at least in part, of an indication of priority as contained in at least one of the plurality of information bundles and the plurality of reservation requests.

10. The method of claim 1, wherein the step of selecting from amongst the plurality of information bundles and the plurality of reservation requests to provide at least two selected information bundles to be transmitted includes the step of selecting as a function, at least in part, of any of the following:

time of arrival;

size of total message;

system control information as versus user information;

half-duplex as versus fill-duplex operability of a particular communication unit.

11. The method of claim 10, where in the step of selecting further includes the step of selecting as a function, at least in part, of an indication of priority.

12. The method of claim 1, where in the step of selecting further includes the step of selecting as a function, at least in part, of inbound as versus outbound transmission.

13. The method of claim 12, wherein the step of selecting as a function, at least in part, of inbound as versus outbound transmission favors inbound.

14. The method of claim 12, wherein the step of selecting as a function, at least in part, of inbound as versus outbound transmission includes the step of alternating favoring inbound and outbound transmission.

15. In a wireless two-way communication system, a method comprising the steps of:

receiving a plurality of information bundles intended for subsequent outbound transmission, wherein at least one of the information bundles is intended for reception by a half-duplex communication unit;

receiving at least one reservation request that corresponds to at least one information bundle intended for subsequent inbound transmission by the half-duplex communication unit;

selecting from amongst the plurality of information bundles and the at least one reservation request to provide at least two selected information bundles to be transmitted, wherein the selection avoids simultaneous reception and transmission by the half-duplex communication unit;

assigning at least a part of a communication resource to support transmission of the selected information bundles.

16. In a wireless two-way communication system, a method comprising the steps of:

receiving one or more requests for communication resource assignment;

when a communication resource is available for assignment, selecting one of the one or more requests, yielding a selected request;

determining if a half-duplex communication unit is associated with the selected request;

when a half-duplex communication unit is associated with the selected request, determining if the half-duplex communication unit is active on any communication resource;

when a half-duplex communication unit is associated with the selected request, and the half-duplex communication unit is active on any communication resource, thereby resulting in a half-duplex conflict, resolving the half-duplex conflict relating to the selected request.

17. The method of claim 16, wherein the step of resolving the half-duplex conflict comprises the step of delaying granting of the selected request.

18. The method of claim 17, wherein the step of delaying granting of the selected request comprises assigning one of the plurality of communication resources to the selected request after assigning one of the plurality of communication resources to a request received after the selected request was received.

19. The method of claim 16, wherein the step of resolving the half-duplex conflict comprises the step of advancing granting of the selected request by assigning one of the plurality of communication resources to the selected request before assigning one of the plurality of communication resources to a request received before the selected request was received.

20. The method of claim 16, wherein a request for communication resource assignment comprises either a reservation request that corresponds to an information bundle intended for subsequent inbound transmission or an outbound information bundle intended for subsequent outbound transmission.

21. In a wireless two-way communication system having a plurality of communication resources, a method comprising the steps of:

receiving at least one information bundle intended for subsequent outbound transmission, yielding at least one outbound request;

when one of the plurality of communication resources is available for assignment, selecting one of the at least one outbound request, yielding a selected request;

determining if the target of the selected request is a half-duplex communication unit;

when a half-duplex communication unit is the target of the selected request, determining if the target is transmitting on any of the plurality of communication resources;

when a half-duplex communication unit is the target of the selected request, and the target is transmitting on any of the plurality of communication resources, thereby resulting in a half-duplex conflict, resolving the half-duplex conflict relating to the selected request.

22. The method of claim 21, wherein the step of resolving the half-duplex conflict comprises the step of delaying granting of the selected request.

23. The method of claim 22, wherein the step of delaying granting of the selected request comprises assigning one of the plurality of communication resources to the selected request after assigning one of the plurality of communication resources to a request received after the selected request was received.

24. The method of claim 21, wherein the step of resolving the half-duplex conflict comprises the step of advancing granting of the selected request by assigning one of the plurality of communication resources to the selected request before assigning one of the plurality of communication resources to a request received before the selected request was received.

25. In a wireless two-way communication system having a plurality of communication resources, a method comprising the steps of:

receiving at least one reservation request that corresponds to an information bundle intended for subsequent inbound transmission, yielding at least one inbound request;

when one of the plurality of communication resources is available for assignment, selecting one of the at least one inbound request, yielding a selected request;

determining if the source of the selected request is a half-duplex communication unit;

when a half-duplex communication unit is the source of the selected request, determining if the target is receiving on any of the plurality of communication resources;

when a half-duplex communication unit is the source of the selected request, and the source is receiving on any of the plurality of communication resources, thereby resulting in a half-duplex conflict, resolving the half-duplex conflict relating to the selected request.

26. The method of claim 25, wherein the step of resolving the half-duplex conflict comprises the step of delaying granting of the selected request.

27. The method of claim 26, wherein the step of delaying granting of the selected request comprises assigning one of the plurality of communication resources to the selected request after assigning one of the plurality of communication resources to a request received after the selected request was received.

28. The method of claim 25, wherein the step of resolving the half-duplex conflict comprises the step of advancing granting of the selected request by assigning one of the plurality of communication resources to the selected request before assigning one of the plurality of communication resources to a request received before the selected request was received.

* * * * *

UNITED STATES PATENT AND TRADEMARK OFFICE
CERTIFICATE OF CORRECTION

PATENT NO. : 5,970,056
DATED : October 19, 1999
INVENTOR(S) : Brailean et al.

It is certified that error appears in the above-identified patent and that said Letters Patent is hereby corrected as shown below:

<u>Column 14,</u>
Line 9, reads "claim 1" should be -- claim 11 --.
Line 15, reads "claim 12" should be -- claim 11 --.

Signed and Sealed this

Eighteenth Day of September, 2001

Attest:

Nicholas P. Godici

NICHOLAS P. GODICI
*Attesting Officer*     *Acting Director of the United States Patent and Trademark Office*